F. RIEBER.
APPARATUS FOR PRODUCING UNIDIRECTIONAL ELECTRIC CURRENTS OF HIGH POTENTIAL.
APPLICATION FILED SEPT. 13, 1915.
1,195,733.  Patented Aug. 22, 1916.
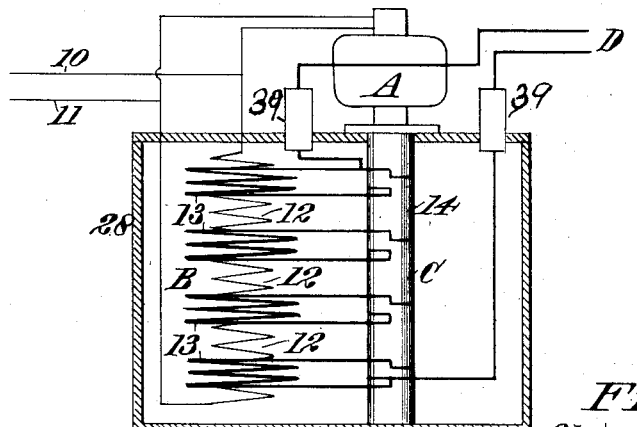
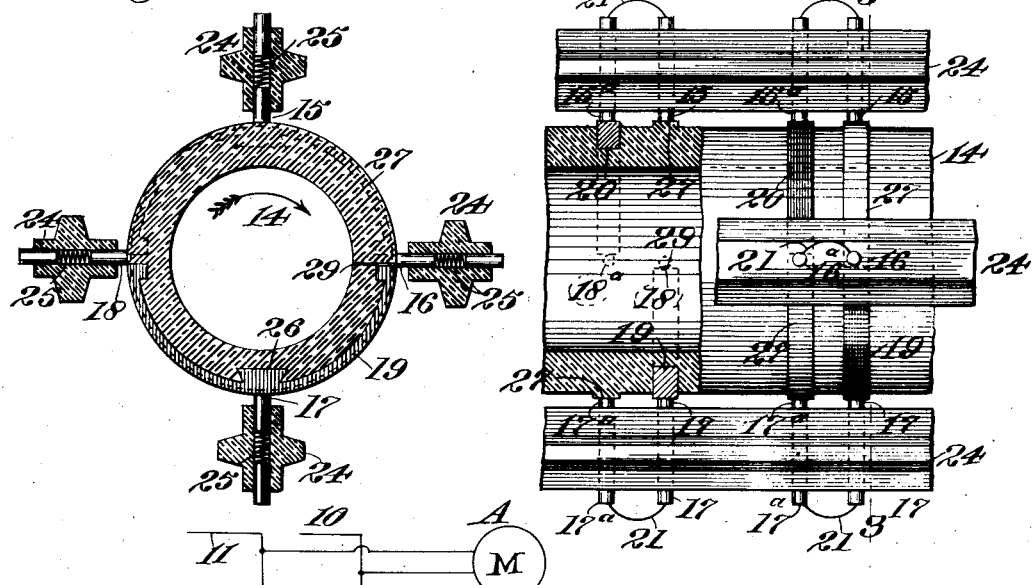
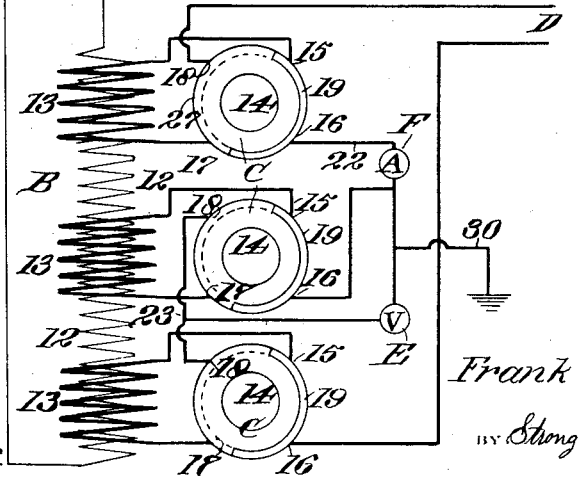
WITNESSES:
INVENTOR
Frank Rieber,
BY Strong & Townsend
ATTORNEYS

UNITED STATES PATENT OFFICE.

FRANK RIEBER, OF BERKELEY, CALIFORNIA.

APPARATUS FOR PRODUCING UNIDIRECTIONAL ELECTRIC CURRENTS OF HIGH POTENTIAL.

1,195,733.

Specification of Letters Patent. Patented Aug. 22, 1916.

Application filed September 13, 1915. Serial No. 50,412.

*To all whom it may concern:*

Be it known that I, FRANK RIEBER, a citizen of the United States, residing at Berkeley, in the county of Alameda and State of California, have invented new and useful Improvements in Apparatus for Producing Unidirectional Electric Currents of High Potential, of which the following is a specification.

The present invention relates to a method of generating, in a plurality of electric circuits, alternating currents of relatively low potential, of causing those currents to pass through reversing switches, which are actuated at each passage of the alternating potential through zero value, in such a manner as to deliver all the potential waves in the same direction, and of the combination of the resultant plurality of low potential unidirectional currents to cause the flow of a high potential unidirectional current. Ordinarily, the production of unidirectional electric currents of high potential is accomplished by the use of a transformer, delivering high potential alternating current, and a converting device which selects parts of the high potential currents and passes them on to a receiving device in substantially the same direction. These devices are commonly actuated by synchronous motors, arranged to drive a rotating high potential switch. Because of the large dimensions of such switches, it is impractical to construct them so as to make actual metallic contact for the transfer of current. They are, on account of the mechanical difficulties that would be involved in obtaining a complete metallic circuit for the transfer of current, commonly made with an air gap between the members. This air gap is made to vary in length during the operation of the device, said variations being in synchronism with the alterations of the electric potential to be passed through them. This variation is accomplished in such a manner that the air gap is made short at the proper time for the passage of the desired current and longer at the time when the current is to be interrupted. All such devices have elements of uncertainty in their action, which constitute inherent defects, and which cannot be avoided as long as the same principle of operation is adhered to. These defects, which in the present device are overcome, may be briefly enumerated as follows: Up to the instant when the potential of the alternating supply circuit has reached a sufficient value to cause a spark to discharge through the air gap in the converting device, the alternating system is in a condition of electric stress, or electrostatic charge. The instant that the spark passes, this condition is relieved so abruptly that high frequency electric currents are generated, in the same manner as in the discharge of a Leyden jar. These high frequency currents, besides having a destructive effect on the high tension transformer, are often highly undesirable in the circuit which is being supplied with the pulsating unidirectional current delivered by the device. During the subsequent passage of the current, the resistance of the path offered by the arc, or other imperfectly conducting path in the device, varies in an inverse relation to the amount of current passing across such path. These variations may even become periodic, and the device may continue to operate as a generator of high frequency electric currents. At best, they constitute a variable element in the electric system, and, by their presence, prevent the currents in such a system from being accurately controlled. When the device has reached the position in which the current must be interrupted, the resistance of the air gap is increased with the object of causing the interruption of the circuit. Or the air gap may be maintained at constant length, and the reduction of potential at this part of the alternating wave may be relied upon to cause the interruption of the circuit. In either case, the interruption of the circuit takes place at an indeterminate time, depending only on the value of the current passing through the device at the time, and on the length of the gap through which such current is required to pass. For many purposes, an exact control of the currents supplied by a device of this nature is practically essential.

It is the object of the present invention to provide such an exact control, and, in addition, to furnish a device which shall be practically noiseless in operation, and occupy the smallest practicable space. As a fundamental change, it seemed desirable to eliminate the spark, or arc, included in the circuit, and to substitute a continuous metallic path. On account of inability to accurately time the operation of any synchronously operating device, the reversal of the circuit, which is necessary, cannot be accomplished instantly, but the circuit must be interrupted for the shortest possible time consistent with the ability of the switch actuating device to operate at the exact instant of zero potential.

It is impossible, by the use of a single converting device, operating under the full potential of the desired circuit, to avoid the formation of sparks or arcs to some degree; therefore, in the present device, the high potential circuit is made up of a series of low potential circuits, each individual circuit being connected to the others through its own converting device. On account of the relatively low potential applied to each converting device, it becomes impossible for this device to operate by virtue of the synchronously varied resistance of an air gap; it becomes necessary to establish a complete metallic circuit before a current can pass, and to maintain this circuit as long as it is desired to pass such a current. Also, on account of the relatively low potential applied to each device, it becomes possible to decrease the diameter of each translating device to a very great degree; this makes for smaller mechanical construction, and also enables the device to be submerged in oil, without causing undue friction. By submerging the series of translating devices in oil, preferably in the same case with the transformer comprised of the necessary plurality of low potential circuits supplying the energy, and by mechanically inter-connecting the said converting devices, to facilitate their being driven from the same actuating device, a very compact device is formed.

One form which my invention may assume is exemplified in the following description and illustrated in the accompanying drawings, in which—

Figure 1 shows a plan view, in diagram, of the device embodying my invention. Fig. 2 shows a diagrammatic representation of the connections employed in my device. Fig. 3 shows a transverse sectional view of the reversing switch employed. Fig. 4 shows a side elevation, partly in section, of the device illustrated in Fig. 3.

Referring in detail to the form of my invention, illustrated herewith there is shown a synchronous motor A intended to be operated by a 60 cycle alternating current at a speed of 1800 revolutions per minute and connected to the mains 10 and 11. Also connected with the main feed wires is a step-up transformer B, comprising a single primary 12 and a plurality of secondaries 13, said secondaries being individually of relatively low potential. Converting devices C are employed for converting the alternating current from the secondaries of the transformer into unidirectional current, which converting devices comprise a plurality of reversing switches, one for each secondary. Each of said switches has its rotating elements carried on the shaft 14 of the motor and its stationary parts mounted on frame members.

The stationary parts of each switch are in the form of four pairs of brushes, 15, 15$^a$, 16, 16$^a$, 17, 17$^a$, 18 and 18$^a$, similar to commutator brushes, the brushes of each pair being slightly spaced apart in a longitudinal direction upon the shaft, and the four pairs arranged about the shaft in regularly spaced intervals of 90°. In position to contact with one set of brushes, viz: 15, 16, 17 and 18, is a brass segment or conducting arc 19 of about 180° in extent and sunk in the insulating material of which the shaft is constructed. Opposed to the segment 19, on the opposite side of the shaft and in a slightly off-set position to contact with the other series of brushes, viz: 15$^a$, 16$^a$, 17$^a$ and 18$^a$, is a second conducting arc 20 of the same size as the member 19 and secured to the shaft in the same manner.

Connected across each pair of brushes is a conductor 21 and the terminals of each secondary of the transformer are connected with the brushes 15 and 17 of the adjacent switch, while the terminal brushes 16 and 18 of the switches are joined in series by wires 22 and 23 leading to a receiving circuit D, in which may be placed X-ray tube or other commercial high tension apparatus intended to be operated.

In the operation of the device so far described two complete negative waves and two complete positive waves will occur with each revolution of the motor shaft 14. Alternating current of low potential will be induced in each of the secondaries of the transformer, and with the parts in the position shown in the diagram in Fig. 2 the current will pass through the brushes 15, arcs 19, brushes 16 to the receiving circuit, where all of the currents due to the series connection of the switch terminals will be united, to produce the desired high potential for operating the vacuum tube or other device at hand. The return circuit at this period in the operation of the device will be through brushes 18$^a$, arcs 20 and brushes 17$^a$ to the secondaries of the transformer. The circuit just traced will endure while the shaft 14 makes a quarter of a revolution, which is equal to the duration of one sign wave in the alternating current delivered to the reversing switch. This circuit, at the end of 90° movement on the part of the motor shaft, is broken, but instantly reëstablished in the opposite direction through brushes 15, arcs 19 and brushes 18 to the receiving circuit, returning through brushes 17$^a$, arcs 20 and brushes 16$^a$. It will thus be seen that the current is always sent in the same direction through the receiving circuit D, and though of relatively low potential as it passes through the switches is raised to the desired potential on account of the series connection of the switch terminals.

Each of the commutator brushes is carried in an insulated holder 24, and is evenly held in contact with the rotating brass segment by means of a spring 25; each segment or conducting arc is slightly counter-sunk in the shaft 14, being preferably cast therewith, and is held thereon by dovetail connections 26. It is also preferable to make the segmental conductors of comparatively thick material on account of wear, and allow them to project above the periphery of the shaft 14. Therefore, in order to provide a smooth and even path for the commutator brushes I form a peripheral rib 27 integral with the shaft 14, and also of insulated material, flush with and in alinement with each of the segmental conductors and completing the circle. The brass segments may be made fully 180° in length, inasmuch as arcing at the ends is prevented by the off-set relation thereof. It is preferable, however, to slightly shorten them, so that at the instant the circuit is broken the other is made.

A casing 28, which is similar to those commonly used to contain transformers, is utilized in this device and receives both the transformer, with its plurality of secondaries, and the switches or converting devices. This casing is adapted to be filled with oil or other insulating liquid and is provided with two insulating bushings 39 for carrying the high potential terminals through the casing. A feature in the construction of a satisfactory high potential transformer is that of immersing the same in insulating oil, and by reason of the relatively small diameter of the reversing switches, made possible by the decreased potential impressed thereon, I am enabled to use the same casing and immerse the switches also. If separate conductors from the individual circuits or secondaries were brought out of the casing, these, while developing relatively low potential themselves, might, during operation, have a potential vastly different from that of the inclosing casing and their insulation from said casing would present, therefore, a difficult problem. By inclosing the reversing switches, as well as the transformer, in the same casing as above described, I avoid this difficulty. Another reason for the use of oil or other insulating liquid to immerse the converting device in is the relatively large potential that can be impressed on each unit without causing sparking or any of the undesirable irregularities of operation.

The motor shaft 14 is hollow and open at one end to admit oil therein, and adjacent the ends of each of the segmental conductors 19 and 20 I provide an oil duct 29, which, by causing a jet of oil to be thrown out as the shaft is rapidly rotated in the insulating liquid, will prevent arcing and consequent carbonization at the points where the contact with the brushes is broken.

On account of the fact that the unidirectional currents from a plurality of circuits are combined to give a higher potential, a direct current voltmeter E may be connected across the terminals of one or more of these low potential unidirectional circuits. This meter will give readings almost exactly proportioned to the total potential the plurality of circuits are generating. A direct current ammeter F may also be inserted at any point in the common unidirectional circuit, to measure the current flowing. If these two meters are inserted at, or near, a common point in the said circuit, and a connection 30 made from that point to the earth, the said meters may be safely read, and even handled, by an observer, without danger of electric shock. Such direct current meters have characteristics of operation which render them highly superior to alternating current instruments. They are far quicker in action, altogether more dependable, and may be constructed to have very high damping, so that the pointer does not oscillate before coming to rest.

By constructing an apparatus of a plurality of the units just described, and by combining the unidirectional potentials derived from the several units, unidirectional electric current of high potential may be obtained. The currents delivered by this device flow at all times through a complete metallic circuit until delivered to the terminals of the device. The resistance of this circuit is constant to a high degree, and contains no variable factors of arc or spark resistance found in all similar devices. At the instant when the current reaches its lowest value, the reversal of circuit is accomplished with the maximum possible speed. The necessary cessation of current delivery during the reversing operation occurs and ceases at a definite time. The relatively low potential, and the immersion in an insulating liquid, prevent the prolonging of current flow in the form of arcs.

A plurality of mechanically interconnected switches, each transmitting alternating current of relatively low potential to a common circuit, said current being delivered from the switch as unidirectional current, will occupy only one-fourth the space occupied by any device performing a similar service, when the latter device comprises switching mechanism which receives the full potential of alternating current desired, and delivers the same potential of unidirectional current. A device of this nature, when operated beneath oil or other insulating liquid, is practically noiseless.

The distinction between low potential and high potential is necessarily an arbitrary one. What I mean by a relatively low potential is any potential at which an alternating current may be passed through a reversing switch without the formation in such switch of sparks or arcs, destructive to the insulation or electrodes thereof. What I understand, and intend to designate by the term "high potential" is a potential sufficient to operate vacuum tubes, dust precipitators, and other commercial high tension apparatus. Such potentials are far too great to be handled at one step by any such reversing switch mechanism as I propose.

While I have shown and described but one form of device herewith, it will be understood, nevertheless, that the same is susceptible to modification. Therefore, many changes in the construction and arrangement of the several parts may be resorted to without departing from the spirit of my invention as disclosed in the appended claims.

Having thus described my invention, what I claim and desire to secure by Letters Patent is—

1. In an apparatus for producing unidirectional currents of high potential, the combination with a source of single phase alternating current supply, of means for transforming alternating current from said source simultaneously into a plurality of relatively low tension current waves and means for simultaneously delivering, in series and in one predetermined direction, substantially all portions of all of the relatively low tension waves to a common receiving circuit.

2. In an apparatus for producing unidirectional electric currents of high potential, the combination with a single phase alternating current source of supply, of a plurality of relatively low tension converting devices, a synchronous driving agency for said converters, all of said converting devices having their terminals joined operatively in series for supplying relatively high potential unidirectional waves to a common receiving circuit.

3. In an apparatus for producing unidirectional electric currents of high potential, the combination with a source of single phase alternating current supply, of a plurality of low potential transformers connected with said source of supply, a plurality of low tension converting devices, connected with said transformers and all arranged to simultaneously deliver unidirectional waves of relatively high potential to a common receiving circuit, and a synchronous driving agency for said converters.

4. In an apparatus for producing unidirectional electric currents of high potential, the combination with a source of single phase alternating current supply, of a step-up transformer, having a single primary and a plurality of secondaries, and a low tension converting device for each of said secondaries operative during successive alternations of said current for delivering unidirectional current waves of relatively high potential to a common receiving circuit and a synchronous driving agency for said converters.

5. In an apparatus for producing unidirectional electric currents of high potential, the combination with a source of single phase alternating current supply, of a synchronous motor, operated by said alternating current, a transformer having its primary connected with the source of supply and comprising a plurality of secondaries, each of relatively low potential, and a metallic contact reversing switch for each of said secondaries adapted to reverse when the current waves in the secondaries have approached nearest to zero, all of said switches being connected in series and simultaneously operative for supplying relatively high potential unidirectional waves to a common receiving circuit.

6. In an apparatus for the production of unidirectional electric currents of high potential, the combination with a source of single phase alternating current supply, of a transformer having a plurality of secondary circuits of relatively low potential, with means, synchronously actuated by the alternating current, for causing all of the said individual circuits to be operatively connected together by a good conducting path, or metallic circuit; said connection being made in such a manner that the individual potentials combine to give a resultant higher potential; and adapted to be maintained during the entire potential wave of the alternating current, and to be reversed with the maximum possible speed during the time when said potential wave has reached its lowest value, in such a manner that the resultant current emerging from the apparatus is always in the same direction.

7. In an apparatus for the production of unidirectional electric currents of high potential, the combination with a plurality of circuits each carrying single phase alternating current of relatively low potential, of means for maintaining an electric circuit of low and constant resistance traversing all of the said plurality of circuits during the entire duration of each potential wave of the alternating current, means for reversing the direction in which such current traverses each individual low potential circuit, at the instance when the potential of all the circuits has attained its lowest value, and a common receiving circuit connected with said reversing means and receiving the current from said plurality of circuits in one direction.

8. In an apparatus for producing unidirectional electric currents of high potential, the combination with a source of alternating current supply, of a step-up transformer, having a single primary and a plurality of secondaries, and a low tension converting device for each of said secondaries, operating in synchronism with the pulsations of said alternating current for delivering unidirectional current waves of relatively high potential to a common receiving circuit, and a common oil container for said transformers and converting devices.

9. In an apparatus for producing unidirectional electric current from an alternating source of supply, a reversing switch for converting the alternate current waves into unidirectional waves, comprising a plurality of stationary contact members angularly spaced, and rotatable conducting arcs arranged in off-set opposed relation for engaging therewith to close the circuit successively between adjacent stationary members.

10. In an apparatus for producing unidirectional electric current from an alternating source of supply, a reversing switch for converting the alternate current waves into unidirectional waves, comprising a plurality of pairs of stationary contact members angularly spaced, and a pair of rotatable conducting arcs arranged in off-set opposed relation, each in alinement with half of the stationary contact members for closing the circuit successively between the adjacent angularly spaced members.

11. In an apparatus for the production of unidirectional electric currents of high potential, the combination with a container filled with oil, or other insulating liquid, of a transformer having a plurality of secondary circuits of relatively low potential, and immersed in the liquid in said container, and a plurality of reversing switches, likewise immersed in the said liquid, connected together mechanically, driven by the same source of power, and electrically connected to the individual secondary windings in such a manner as to pass all of the potential waves of the alternating current out from the device in the same direction, and to maintain a complete electric circuit of low and constant resistance during substantially the entire duration of the said potential waves.

12. In an apparatus for producing unidirectional electric currents of high potential, the combination with a plurality of sources of alternating current, of a corresponding plurality of mechanically interconnected reversing switches; each of said reversing switches comprising an insulating body, in which conducting arcs are embedded, exposed smooth contacting surfaces provided on said arcs, conducting brushes bearing on said contacting surfaces, means for causing relative rotation between the said insulating body with its embedded arcs, and the said brushes, at a speed such that the reversal of current through said reversing switches occurs simultaneously, and at the same time with the passage of the alternating potentials through their lowest value, and means, actuated by said rotation, for causing a stream of oil or other insulating liquid to pass rapidly through the gap formed when the contacting sector passes from beneath any brush.

13. In an apparatus for producing unidirectional electric currents of high potential, the combination with a source of single phase alternating current supply, of a transformer having a plurality of low potential secondaries, and converting devices for converting substantially all portions of the alternating current waves set up in all of the secondaries into unidirectional waves, and delivering the same to a common receiving circuit, said converting devices offering a constant resistance to the passage of current therethrough.

In testimony whereof I have hereunto set my hand in the presence of two subscribing witnesses.

FRANK RIEBER.

Witnesses:
 JOHN H. HERRING,
 W. W. HEALEY.